April 24, 1945.   R. S. JONES, JR   2,374,208
HEAT EXCHANGER
Filed April 20, 1942
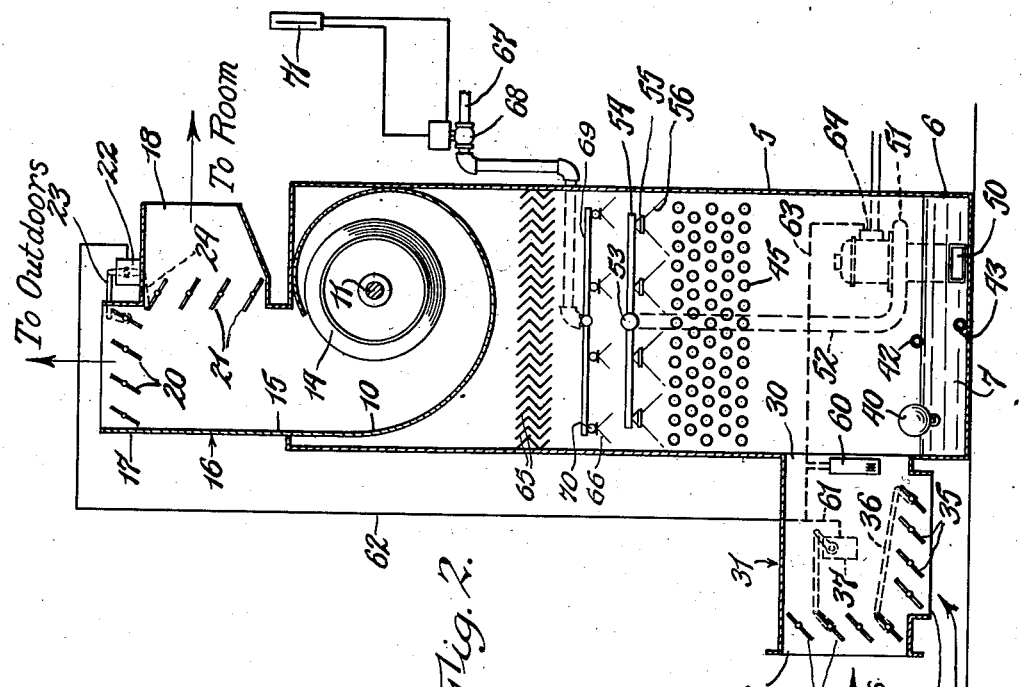
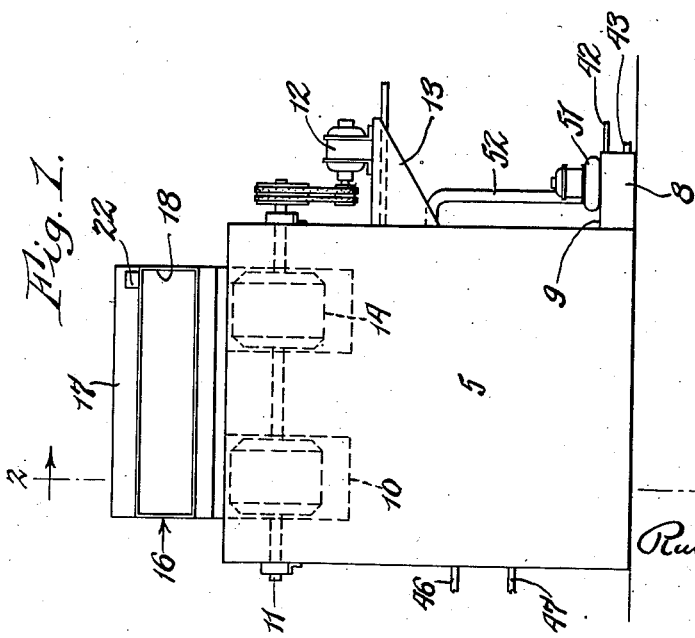
INVENTOR
Russell S. Jones Jr
BY
Popp and Popp
ATTORNEYS Patented Apr. 24, 1945

2,374,208

UNITED STATES PATENT OFFICE 2,374,208

HEAT EXCHANGER

Russell S. Jones, Jr., Chicago, Ill., assignor to Niagara Blower Company, New York, N. Y., a corporation of New York Application April 20, 1942, Serial No. 439,621

10 Claims. (Cl. 257—2)

This invention relates to a heat exchanger and more particularly to a heat exchanger which is primarily employed to cool industrial liquids and which is also employed, during cool weather, to heat the air in the industrial plant or factory through heat derived from the industrial liquid being cooled.

The conventional method of cooling such industrial liquids has long been to pass the liquid through shell and tube or double pipe heat exchangers where the heat was taken up by water which had been previously cooled in a cooling tower or spray pond or which required cold wells, or the costly consumption of city water. This required a large amount of apparatus and is difficult to expand in capacity without costly additions to the system.

In the heat exchanger forming the subject of the present invention the air is drawn by fans through a casing containing coils through which the hot industrial liquid is passed, the liquid being kept in a closed system. Simultaneously the coils are drenched by dense sprays of water, the evaporation of which, as it strikes the hot coils, so greatly increases the heat transfer that the equipment is much more compact than conventional systems as above described and can be conveniently located near the work either indoors or out. The temperature of the industrial liquid to be cooled can be brought down to a point very near to the wet bulb temperature of the outside air without mechanical refrigeration. Only a small amount of the spray water is evaporated and removed with the leaving air. The rest falls into a tank and is recirculated through the sprays, so that the loss of water is only about 5% of that used in continuous flow cooling.

It is the principal object of the present invention to provide such an evaporative type heat exchanger for cooling industrial liquids in which the apparatus is employed, during cool weather, to heat and deliver air into the factory building or plant thereby to heat the factory building or plant through heat derived from the industrial liquid being cooled with a resultant saving in the cost of heating the factory building or plant.

Another object of the invention is to provide such a heat exchanger which is entirely automatic in changing from its function of evaporative cooling to air heating, the apparatus being designed to automatically shift from one function to the other when the temperature of the air passing through the apparatus reaches 45° F.

Another object of the invention is to provide such a heat exchanger in which the minimum temperature of the air passing through the apparatus is maintained near to 45° F. so as to permit, during the wintertime, a more exact control of the cooling of the industrial liquid and a more exact control of the temperature of the heated air delivered into the factory building or plant.

Another object of the invention is to provide such a heat exchanger in which the humidity of the air delivered to the factory building or plant during cool weather is under exact control.

Other objects are to provide a heat exchanger accomplishing the above which is relatively simple in construction and operation and which will stand up under conditions of severe and constant use without getting out of order or requiring repairs.

In the accompanying drawing:

Fig. 1 is a side elevation of a heat exchanger embodying the present invention.

Fig. 2 is a vertical transverse section, on an enlarged scale, this section being taken on line 2—2, Fig. 1.

The heat exchanger is shown in the drawing as including a sheet metal casing 5 which is formed at its base to provide a tank 6, this tank 6 containing a body of water 7 which is evaporated to provide the cooling effect during warmer weather. The tank 6 is preferably extended beyond one end of the casing 5, as indicated at 8, and this extension is provided with a top 9.

A plurality of fan housings 10 are mounted in the upper part of the casing 5, the inlets of these fan housings being in communication with the interior of the casing 5 so as to exhaust air therefrom. A common shaft 11 extends through the several fan housings 10 and is shown as driven by a motor 12 mounted on a bracket 13 at one end of the casing 5. Within each fan housing the shaft 11 carries a fan wheel 14, these fans drawing the air rom the interior of the casing 5 and discharging it through the outlets 15 of the several fan housings which project upwardly through the top of the casing 5. The outlets 15 of the several fan housings 10 are shown as connecting with a common casing or manifold 16, this manifold having a vertical upwardly extending exhaust duct 17 which leads to the outside of the building in which the apparatus is located and also having a horizontal duct 18 which leads to the room or other enclosure to be heated during cool weather.

The discharge of the air either through the exhaust duct 17 or the supply duct 18 to the room or enclosure to be heated is controlled by a plurality of exhaust air dampers 20 in the exhaust duct 17 and a plurality of room air dampers 21 in the duct leading to the room or other enclosure to be heated. Each of these groups of dampers is connected to work in unison and the two groups are actuated by a damper motor 22, this damper motor 22 having a link connection with the exhaust dampers 20 and also having a link connection 24 with the room air dampers 21, the damper motor 22 acting to open one set of dampers and to close the other set of dampers in the manner hereinafter described.

Air is admitted to the bottom of the casing 5 through an air inlet 30 which connects with an air inlet box 31 having a fresh or outside air duct 32 leading to the outside and a room air duct 33 communicating with the room or enclosure in which the apparatus is placed. A plurality of outside or fresh air dampers 34 are provided in the outside or fresh air duct 32 and a plurality of room air dampers 35 are arranged in the room air duct 33. Each set of these dampers is interconnected to work in unison and the two sets of dampers are cross connected by a link 36 so as to work in opposition to each other, the fresh air dampers 34 closing when the room air dampers 35 open and vice versa. The two sets of dampers 34 and 35 are operated by a damper motor 37.

The water 7 to the tank 6 can be supplied through a float valve 40 and the tank 6 is shown as provided with an overflow pipe 42 and a drain pipe 43. This water 7 is used to provide the spray water for drenching the bank of coils 45 through which the industrial liquid to be cooled is passed, this bank of coils being shown as provided with an inlet line 46 and an outlet line 47 extending through one end wall of the casing 5. The water for spraying the bank of cooling coils 45 is shown as withdrawn from the tank 6 through the inlet 50 of a pump 51 which is shown as mounted on the top wall 9 of the extension 8 and as having a vertical outlet pipe 52 connected with a horizontal pipe 53 extending lengthwise through the interior of the casing 5 above the bank of cooling coils 45. This horizontal pipe 53 is shown as carrying a suitable number of branch pipes 54, each of which carries a plurality of downwardly discharging nozzles 55. The nozzles 55 are arranged above the bank of coils 45 which carry the industrial liquid to be cooled so that these coils are constantly flushed or drenched by the sprays 56 from the nozzles 55. The excess water from the cooling coils 45 falls back into the tank 6 to be again recirculated. The operation of the dampers 20, 21, 34 and 35 and the operation of the spray water pump 51 is under control of a thermostat 60 in the air inlet 30 to the casing 5. For this purpose one branch line 61 from the thermostat 60 leads to the damper motor 37 controlling the fresh air dampers 34 and room air dampers 35; another branch line 62 from the thermostat 60 leads to the damper motor 22 which controls the exhaust dampers 20 and the room air dampers 21 and another branch 63 leads to a controller 64 on the motor of the spray water pump 51.

To prevent entrained water from being drawn into the fan housings 10 and discharged, a series of eliminator plates 65 is provided above the sprays 56. In order to provide for control of the humidity of the air delivered to the enclosure or room to be heated during cool weather, a system of humidifying sprays 66 is shown as provided immediately below the eliminator plates 65. These sprays 66 are supplied with water from a line 67 under control of a diaphragm valve 68, the line 67 being shown as connecting with a plurality of branch lines 69 within the casing 5 carrying spray heads 70. The operation of the diaphragm valve 68 is shown as being under control of a hygrostat 71 arranged in the room or other enclosure which is to be heated during cool weather.

In the operation of the heat exchanger, as above described, it is assumed that the motor 12 is constantly running so as to operate the fan wheels 14 and it is also assumed that a stream of the industrial liquid to be cooled is being supplied to the cooling coil 45 through its inlet and outlet 46 and 47. During warm weather conditions, that is, when the outside temperature is above 45° F., at which time no heating of the air in the factory building or plant is required, the apparatus operates as an evaporative cooler to cool the hot industrial liquid passing through the bank of coils 45, the humid air resulting from the evaporation of the spray water on these coils being discharged back outside through the exhaust duct 17. For this purpose, at temperatures above 45° F., the thermostat 60, through its control line 61, holds the damper motor 37 in the position in which the fresh air dampers 34 are held fully open and the room air dampers 35 fully closed. At the same time the thermostat 60, through its control line 62, holds the damper motor 22 in the position in which the exhaust air dampers 20 are held fully open and the room air dampers 21 fully closed. At the same time, the thermostat 60, through its control line 63, actuates the controller 64 to energize the motor of the pump 51. With this setting of the thermostat 60 it will therefore be seen that the continuously operating fan wheels 14 draw fresh air from the outside in through the fresh air duct 32 and supply box 31, past the thermostat 60 and into the lower part of the casing 5. This air is then drawn upwardly past the bank of cooling coils 45 through which the hot industrial liquid is flowing and past the sprays 50 and eliminator plates 55 into the inlets of the fan housings 10. This air is discharged through the fan outlets 15 into the manifold 16 and since at this time the exhaust dampers 20 are opened and the room air dampers 21 closed, all of this air is discharged into the exhaust duct 17, back to the outside.

Since at this time the spray water pump 51 is operating, spray water 7 from the pan 6 is withdrawn by this pump and discharged through the vertical line 52, longitudinal pipe 53 and branch lines 54, through the spray nozzles 55, this spray water drenching the bank of cooling coils 45 through which the hot industrial liquid is passing. This water evaporates upon the cooling coils 45 and reduces the temperature of the industrial liquid passing therethrough to a temperature very near to the wet bulb temperature of the outdoor air which is drawn into the casing 5.

When the temperature of the outside air drops to approximately 45° F., the thermostat 60, through its outlet line 63, deenergizes the motor of the spray water pump 51 so that the spraying of the coils 45 is discontinued. At the same time this thermostat 60, through its outlet line 62, actuates the damper motor 22 so as to close the exhaust air dampers 20 and open the room air dampers 21. Under this condition of operation fresh air is drawn in through the fresh air duct 32, past the thermostat 60 and into the bottom of the casing 5. This relatively cold air is then drawn up through the cooling coil 45 where it operates to cool the hot industrial liquid passing through this bank of coils. This air is heated upon passing the coil 45 and is discharged by the fan wheels 14 through the room air duct 18 so as to heat the factory building or plant and thereby conserve fuel. In this operation it will be noted that the sprays 56 are not in operation since otherwise the air delivered to the room would be substantially saturated and hence would be undesirable for all normal processing.

Upon a further drop of the outside air temperature, the thermostat 60, through its control line 61, actuates the damper motor 37 to progressively close the fresh air dampers 34 and open the room air dampers 35 to a greater degree. By this means the dampers 34 and 35 operate as mixing dampers, the thermostat 60 automatically setting these dampers in the position in which the air drawn into the casing 5 is at a temperature of approximately 45° F. Thus, in extremely cold weather very little fresh air would be admitted through the fresh air duct 32 and a relatively large proportion of room air would be admitted through the room air duct 33 so that the temperature of the air delivered into the bottom of the casing 5 is maintained at approximately 45° F.

During cold weather operation, especially at low outside air temperatures, it is desirable that the air delivered by the apparatus be at the desired relative humidity to maintain the proper air conditions in the enclosure heated by the apparatus. For this purpose, when the relative humidity within the enclosure drops below the setting of the hygrostat 71, this hygrostat opens the diaphragm valve 68 so as to admit water from the water supply line 67 to the spray nozzles 70. These nozzles are relatively few in number, but the evaporation of the water discharged therefrom serves to humidify the passing air to the desired extent to maintain the desired relative humidity in the enclosure.

It will be seen that by the provision of separate humidifying nozzles under control of the hygrostat 71 the desired minimum relative humidity is maintained in the enclosure. It will further be seen that this humidity control is entirely automatic in its operation inasmuch as humidification of the air in the enclosure is only called for when the apparatus is used as a heater for the air delivered to the enclosure.

From the foregoing it will be seen that the present invention provides an evaporative heat exchanger for cooling hot industrial liquids which is also used for space heating. The main disadvantage to the use of such units for space heating has been that the amount of moisture contained in the air has been excessive and objectionable from a heating standpoint. It will be seen that this objection has been overcome by rendering the sprays inoperative when the apparatus is used for space heating, the only operative sprays being the humidifying sprays which are under hygrostat control. It will further be seen that the heat exchanger is entirely automatic in becoming operative and inoperative as a space heater and that the temperature of the air employed in cooling is held at a minimum of 45° F.

I claim as my invention:

1. In a heat exchanger for cooling a stream of liquid and having a casing provided with an air inlet and an air outlet, a cooling coil in the stream of air passing through said casing, means for discharging and distributing water over said cooling coil to wet the exterior of said cooling coil and to evaporate and absorb heat therefrom and means for conducting said stream of liquid to be cooled through said cooling coil; an exhaust duct connected with said air outlet and leading to the outside, a warm air duct connected with said air outlet and leading to an enclosure, means for deflecting a substantial quantity of the air from said air outlet alternately into said exhaust duct and said warm air duct, control means for rendering said discharging and distributing means operative and inoperative, and thermostat means actuating said control means and said deflecting means to deflect the air from said air outlet into said exhaust duct when said discharging and distributing means are rendered operative and to deflect the air from said air outlet into said warm air duct when said discharging and distributing means are rendered inoperative.

2. In a heat exchanger for cooling a stream of liquid and having a casing provided with an air inlet and an air outlet, a cooling coil in the stream of air passing through said casing, means for discharging and distributing water over said cooling coil to wet the exterior of said cooling coil and to evaporate and absorb heat therefrom and means for conducting said stream of liquid to be cooled through said cooling coil; an exhaust duct connected with said air outlet and leading to the outside, a warm air duct connected with said air outlet and leading to an enclosure, means for deflecting a substantial quantity of the air from said air outlet alternately into said exhaust duct and said warm air duct, control means for rendering said discharging and distributing means operative and inoperative, and thermostat means responsive to the outside air temperature and actuating said control means and said deflecting means to deflect the air from said air outlet into said exhaust duct when said discharging and distributing means are rendered operative and to deflect the air from said air outlet into said warm air duct when said discharging and distributing means are rendered inoperative.

3. In a heat exchanger for cooling a stream of liquid and having a casing provided with an air inlet and an air outlet, a cooling coil in the stream of air passing through said casing, means for discharging and distributing water over said cooling coil to wet the exterior of said cooling coil and to evaporate and absorb heat therefrom and means for conducting said stream of liquid to be cooled through said cooling coil; an exhaust duct connected with said air outlet and leading to the outside, a warm air duct connected with said air outlet and leading to an enclosure, means for deflecting a substantial quantity of the air from said air outlet alternately into said exhaust duct and said warm air duct, control means for rendering said discharging and distributing means operative and inoperative, and thermostat means arranged in said air inlet and actuating said control means and said deflecting means to deflect the air from said air outlet into said exhaust duct when said discharging and distributing means are rendered operative and to deflect the air from said air outlet into said warm air duct when said discharging and distributing means are rendered inoperative.

4. In a heat exchanger for cooling a stream of liquid and having a casing provided with an outside air inlet and an air outlet, means for moving a stream of air through said outside air inlet, casing and air outlet, a cooling coil in the stream of air passing through said casing, means for discharging and distributing water to wet the exterior of said cooling coil and to evaporate and absorb heat therefrom and means for conducting the said stream of liquid to be cooled through said cooling coil; an air exhaust duct connected with said air outlet and leading to the outside, a warm air duct connected with said air outlet and leading to an enclosure, means for deflecting a substantial quantity of the air from said air outlet alternately into said exhaust duct and said warm air duct, control means for rendering said discharging and distributing means operative and inoperative, and thermostat means responsive to the outside air temperature and actuating said control means and said deflecting means to deflect the air from said air outlet into said exhaust duct and to render said discharging and distributing means operative at outside air temperatures above approximately 45° F. and to deflect the air from said air outlet into said warm air duct and to render said discharging and distributing means inoperative at outside air temperatures below approximately 45° F.

5. In a heat exchanger for cooling a stream of liquid and having a casing provided with an air inlet and an air outlet, means for moving a stream of air through said air inlet, casing and air outlet, a cooling coil in the stream of air passing through said casing, means for discharging and distributing water to wet the exterior of said cooling coil and to evaporate and absorb heat therefrom and means for conducting the said stream of liquid to be cooled through said cooling coil; an air exhaust duct connected with said air outlet and leading to the outside, a warm air duct connected with said air outlet and leading to an enclosure, means for deflecting a substantial quantity of the air from said air outlet alternately into said exhaust duct and said warm air duct, an outside air duct connected with said air inlet, a return air duct connected with said air inlet and leading from said enclosure, mixing means for varying the proportions of outside and return air admitted through said air inlet from said outside air duct and said return air duct, control means for rendering said discharging and distributing means operative and inoperative, and thermostat means actuating said control means and said deflecting means to deflect the air from said air outlet into said exhaust duct and to render said discharging and distributing means operative at outside air temperatures above a predetermined point and to deflect the air from said air outlet into said warm air duct and to render said discharging and distributing means inoperative at outside air temperatures below said predetermined point.

6. In a heat exchanger for cooling a stream of liquid and having a casing provided with an air inlet and an air outlet, means for moving a stream of air through said air inlet, casing and air outlet, a cooling coil in the stream of air passing through said casing, means for discharging and distributing water to wet the exterior of said cooling coil and to evaporate and absorb heat therefrom and means for conducting the said stream of liquid to be cooled through said cooling coil; an air exhaust duct connected with said air outlet and leading to the outside, a warm air duct connected with said air outlet and leading to an enclosure, means for deflecting a substantial quantity of the air from said air outlet alternately into said exhaust duct and said warm air duct, an outside air duct connected with said air inlet, a return air duct connected with said air inlet and leading from said enclosure, mixing means for varying the proportions of outside and return air admitted through said air inlet from said outside air duct and said return air duct, control means for rendering said discharging and distributing means operative and inoperative, and thermostat means actuating said control means, said deflecting means and said mixing means, at outside air temperatures above a predetermined point, to deflect the air from said air outlet into said exhaust duct, to render said discharging and distributing means operative and to admit outside air exclusively into said air inlet and, at outside air temperatures below said predetermined point, to deflect the air from said air outlet into said warm air duct, to render said discharging and distributing means inoperative and to admit return air from said return air duct into said air inlet.

7. In a heat exchanger for cooling a stream of liquid and having a casing provided with an air inlet and an air outlet, means for moving a stream of air through said air inlet, casing and air outlet, a cooling coil in the stream of air passing through said casing, means for discharging and distributing water to wet the exterior of said cooling coil and to evaporate and absorb heat therefrom and means for conducting the said stream of liquid to be cooled through said cooling coil; an air exhaust duct connected with said air outlet and leading to the outside, a warm air duct connected with said air outlet and leading to an enclosure, means for deflecting a substantial quantity of the air from said air outlet alternately into said exhaust duct and said warm air duct, an outside air duct connected with said air inlet, a return air duct connected with said air inlet and leading from said enclosure, mixing means for varying the proportions of outside and return air admitted through said air inlet from said outside air duct and said return air duct, control means for rendering said discharging and distributing means operative and inoperative, and thermostat means in said air inlet and actuating said control means, said deflecting means and said mixing means, at outside air temperatures above a predetermined point, to deflect the air from said air outlet into said exhaust duct, to render said discharging and distributing means operative and to admit outside air exclusively into said air inlet and, at outside air temperatures below said predetermined point, to deflect the air from said air outlet into said warm air duct, to render said discharging and distributing means inoperative and to admit return air from said return air duct into said air inlet in an amount sufficient to maintain the temperature of the air admitted through said air inlet at approximately said predetermined point.

8. In a heat exchanger for cooling a stream of liquid and having an elongated upright casing which is closed at its lower end to provide a pan and is provided immediately above said pan with an air inlet and at its upper end with an air outlet, a fan in the upper part of said casing for moving a stream of air through said air inlet, casing and air outlet, a cooling coil in said casing between said air inlet and said fan and through which said stream of air passes, a plurality of spray nozzles arranged to discharge and distribute water to wet the exterior of said coil and to evaporate and absorb heat therefrom, the excess of said spray water collecting in said pan and a pump recirculating said collected spray water through said spray nozzles and means for conducting the said stream of liquid to be cooled through said cooling coil; an air exhaust duct connected with said air outlet and leading to the outside, a warm air duct connected with said air outlet and leading to an enclosure, means for deflecting a substantial quantity of the air from said air outlet alternately into said exhaust duct and said warm air duct, an outside air duct connected with said air inlet, a return air duct connected with said air inlet and leading from said enclosure, mixing means for varying the proportions of outside and return air admitted through said air inlet from said outside air duct and said return air duct, control means for rendering said pump operative and inoperative, and thermostat means in said air inlet and actuating said control means, said deflecting means and said mixing means, at outside air temperatures above a predetermined point, to deflect the air from said air outlet into said exhaust duct, to render said pump operative and to admit outside air exclusively into said air inlet and, at outside air temperatures below said predetermined point, to deflect the air from said air outlet into said warm air duct, to render said pump inoperative and to admit return air from said return air duct into said air inlet in an amount sufficient to maintain the temperature of the air admitted through said air inlet at approximately said predetermined point.

9. In a heat exchanger for cooling a stream of liquid and having a casing provided with an air inlet and an air outlet, a cooling coil in the stream of air passing through said casing, means for discharging and distributing water over said cooling coil to wet the exterior of said cooling coil and to evaporate and absorb heat therefrom and means for conducting said stream of liquid to be cooled through said cooling coil; an exhaust duct connected with said air outlet and leading to the outside, a warm air duct connected with said air outlet and leading to an enclosure, means for deflecting a substantial quantity of the air from said air outlet alternately into said exhaust duct and said warm air duct, control means for rendering said discharging and distributing means operative and inoperative, thermostat means actuating said control means and said deflecting means to deflect the air from said air outlet into said exhaust duct when said discharging and distributing means are rendered operative and to deflect the air from said air outlet into said warm air duct when said discharging and distributing means are rendered inoperative, means for humidifying the stream of air passing through said casing and means responsive to the humidity of the air in said enclosure and regulating said humidifying means.

10. In a heat exchanger for cooling a stream of liquid and having a casing provided with an air inlet and an air outlet, means for moving a stream of air through said air inlet, casing and air outlet, a cooling coil in the stream of air passing through said casing, means for discharging and distributing water to wet the exterior of said cooling coil and to evaporate and absorb heat therefrom and means for conducting the said stream of liquid to be cooled through said cooling coil; an air exhaust duct connected with said air outlet and leading to the outside, a warm air duct connected with said air outlet and leading to an enclosure, means for deflecting a substantial quantity of the air from said air outlet alternately into said exhaust duct and said warm air duct, an outside air duct connected with said air inlet, a return air duct connected with said air inlet and leading from said enclosure, mixing means for varying the proportions of outside and return air admitted through said air inlet from said outside air duct and said return air duct, control means for rendering said discharging and distributing means operative and inoperative, thermostat means in said air inlet and actuating said control means, said deflecting means and said mixing means, at outside air temperatures above a predetermined point, to deflect the air from said air outlet into said exhaust duct, to render said discharging and distributing means operative and to admit outside air exclusively into said air inlet and, at outside air temperatures below said predetermined point, to deflect the air from said air outlet into said warm air duct, to render said discharging and distributing means inoperative and to admit return air from said return air duct into said air inlet in an amount sufficient to maintain the temperature of the air admitted through said air inlet at approximately said predetermined point, means for humidifying the stream of air passing through said casing and means responsive to the humidity of the air in said enclosure and regulating said humidifying means.

RUSSELL S. JONES, Jr.